(12) United States Patent
Wiedmann et al.

(10) Patent No.: US 8,019,082 B1
(45) Date of Patent: Sep. 13, 2011

(54) METHODS AND SYSTEMS FOR AUTOMATED CONFIGURATION OF 802.1X CLIENTS

(75) Inventors: Ulrich Wiedmann, Redwood City, CA (US); Terrance L. Lillie, Redwood City, CA (US); Richard P. Sneiderman, Sunnyvale, CA (US); Christian Wiedmann, Redwood City, CA (US); Robert Zeljko, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 991 days.

(21) Appl. No.: 10/861,011

(22) Filed: Jun. 4, 2004

Related U.S. Application Data

(60) Provisional application No. 60/476,361, filed on Jun. 5, 2003.

(51) Int. Cl.
*H04K 1/00* (2006.01)

(52) U.S. Cl. ............... 380/270; 380/258; 726/1; 726/4; 713/156; 713/171; 713/185; 370/245; 370/252; 370/254; 709/220; 709/227; 709/228; 709/230

(58) Field of Classification Search .................. 726/4, 1; 380/270, 258, 278, 247, 255; 713/156, 171, 713/185; 370/245, 252, 254; 709/220, 227, 709/228, 230
See application file for complete search history.

(56) References Cited

U.S. PATENT DOCUMENTS

| | | | | |
|---|---|---|---|---|
| 6,629,151 | B1 * | 9/2003 | Bahl | 709/250 |
| 7,103,661 | B2 * | 9/2006 | Klein | 709/225 |
| 7,117,526 | B1 * | 10/2006 | Short | 726/5 |
| 7,263,070 | B1 * | 8/2007 | Delker et al. | 370/254 |
| 2001/0054157 | A1 * | 12/2001 | Fukumoto | 713/201 |
| 2002/0176366 | A1 * | 11/2002 | Ayyagari et al. | 370/245 |
| 2003/0014629 | A1 * | 1/2003 | Zuccherato | 713/156 |
| 2003/0169713 | A1 * | 9/2003 | Luo | 370/338 |
| 2003/0188156 | A1 * | 10/2003 | Yasala et al. | 713/156 |
| 2004/0103282 | A1 * | 5/2004 | Meier et al. | 713/171 |
| 2004/0133689 | A1 * | 7/2004 | Vasisht | 709/228 |
| 2006/0173844 | A1 * | 8/2006 | Zhang et al. | 707/9 |

* cited by examiner

*Primary Examiner* — Edan Orgad
*Assistant Examiner* — Kari Schmidt
(74) *Attorney, Agent, or Firm* — Wong, Cabello, Lutsch, Rutherford & Brucculeri, LLP

(57) ABSTRACT

Methods and apparatus for the automated configuration of 802.1x clients in wireless computer networks are described. In one embodiment, a wireless network client for a wireless network is configured automatically, by providing (using a software driver installed at either the network client or a remote server) network configuration information to a software client of the wireless network client.

20 Claims, 7 Drawing Sheets

METHODS AND SYSTEMS FOR AUTOMATED CONFIGURATION OF 802.1X CLIENTS

The present application is related to, incorporates by reference and claims the priority benefit of U.S. Provisional Application 60/476,361, entitled "AUTOMATED CONFIGURATION OF 802.1x CLIENTS", filed Jun. 5, 2003.

FIELD OF THE INVENTION

The present invention relates to mechanisms for automatically configuring a client application so that it can participate in an 802.1x authentication process.

BACKGROUND

Wireless local area networks (WLANs), such as those based on the IEEE 802.11a, 802.11b and 802.11g standards, are becoming ubiquitous in business, government and small office/home office (SOHO) settings because of the freedom afforded by and the decreasing costs of the underlying technology. Current security mechanisms for maintaining the confidentiality, integrity, and availability of wireless communications within such networks are, however, flawed. For example, although the above-cited IEEE standards specify both an authentication service and encryption protocol for wireless networks, methods for compromising these security measures have been well publicized. In response, the community of wireless network equipment developers and vendors has started to adopt the authentication procedures outlined in the 2001 IEEE 802.1x standard entitled "Port Based Network Access Control" in an effort to provide solutions to these security defects. The facilities needed to deploy such access control measures, however, are both expensive and difficult for unsophisticated users to implement.

Before discussing the 802.1x access control mechanisms in detail, it is helpful to review some basics of WLANs in general. Unlike their wired LAN counterparts, WLANs provide for communication among network elements through wireless transmissions (e.g., radio transmissions), as opposed to wired, physical connections. FIG. 1 illustrates an exemplary prior art network 10 including a WLAN. In 802.11-based WLANs, clients or "stations" 12 (i.e., computers with wireless network interface cards (NICs)) interact with other network devices (printers, file servers, other clients, etc.) through access points (APs) 14, which act as bridges between the wired network 16 and wireless network 20. In some cases, wireless clients 12 may communicate directly with one another, without the use of APs.

The 802.1x standard does not itself specify any type of encryption procedures to be used within a network. To date, however, several equipment vendors have offered proprietary versions of dynamic key management for WLANs, using 802.1x as a delivery mechanism. In addition, the Wi-Fi Alliance (a non-profit industry consortium) has included 802.1x in its WPA security standard. Through dynamic key exchanges the authentication server 18 can return individual session keys to an AP 14 as part of the authentication process and these session keys can then be used for encrypted communications between the AP 14 and its clients 12. Dynamic key management provides a more secure environment than is typically found in an 802.11 WLAN because the use of multiple keys that are changed more frequently than is the case for a static key of an ordinary 802.11 network minimizes the opportunity for unauthorized users to uncover the keys.

Unfortunately, implementing an 802.1x solution for a WLAN is not an easy task. For example, the required network infrastructure is complex (potentially involving multiple authentication servers for use in cases of equipment failures) and expensive. In addition, installing the necessary hardware and software in the network and nodes thereof generally cannot be undertaken by unsophisticated users. Consequently, deployment of 802.1x compliant WLANs has not yet become widespread at an enterprise level and is virtually nonexistent at a SOHO level.

SUMMARY OF THE INVENTION

A method, software routine (e.g., a driver or DLL module), and network client for the automated configuration of 802.1x clients in wireless computer networks are described. In one embodiment, a wireless network node for a wireless network is configured automatically, by providing network configuration information to a software client of the wireless network node using a software routine installed on the wireless network node. The network configuration information can be specific to an operating system and a network type of the wireless network node.

The network configuration information that can be automatically provided includes an SSID, a list of available networks, encryption key values, WEP/WPA enablement, EAP properties, authentication method, specific servers, trusted root certification authorities, and/or automatic logon preferences. The network configuration information that is automatically provided can also include 802.1x authentication activation, EAP type, guest authentication, and/or computer authentication information.

In another embodiment, the wireless network node is configured automatically by a network server on a wired network connected to the wireless network node. The network server executes a server software routine (e.g., a driver or DLL module) that automatically configures the wireless network node.

BRIEF DESCRIPTION OF THE DRAWINGS

A better understanding of the present invention can be obtained from the following detailed description in conjunction with the following drawings, in which.

DETAILED DESCRIPTION

Figure 1:
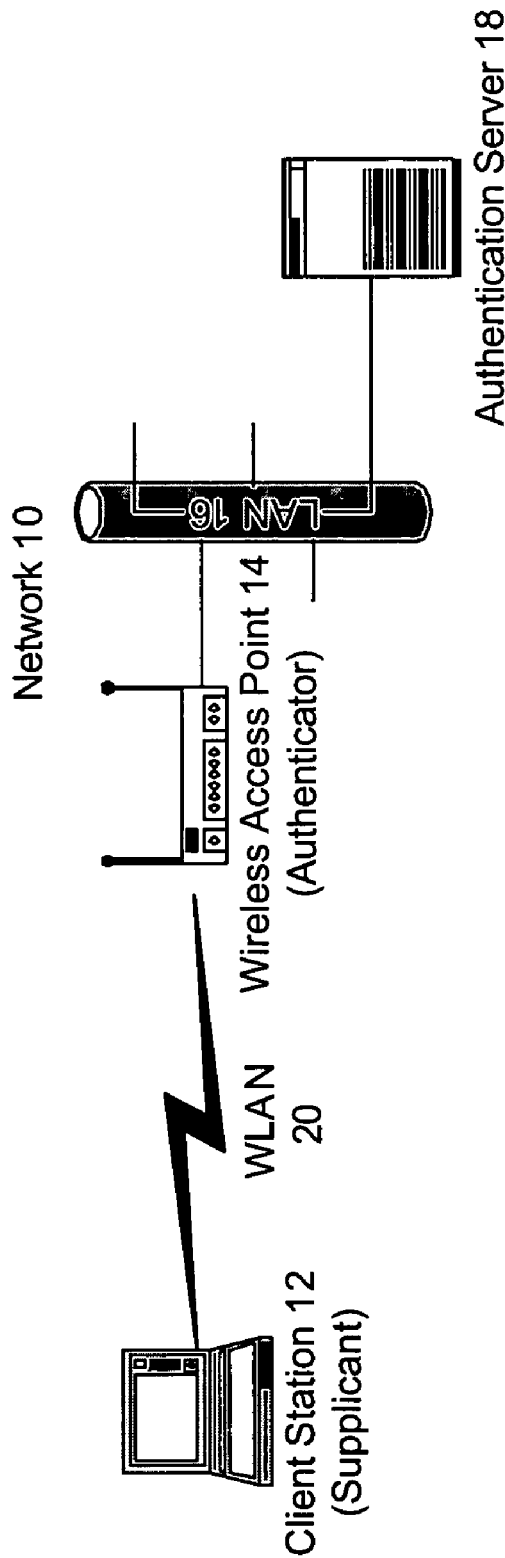
FIG. 1 illustrates an exemplary prior art network including a WLAN.

Described herein is a mechanism for automatically configuring a client application so that it can participate in the 802.1x authentication process. This involves the automated setting of various communication parameters of the client (without need for user intervention or action), thereby simplifying the installation process.

In the following discussion, much of the information is described in terms of processes and procedures to be implemented by one or more computer systems executing appropriate algorithms which are embodiments of the present invention. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the actions and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices. Moreover, as used herein, the term table can refer to any data structure.

As mentioned above, security in IEEE 802.11 networks is provided by an authentication service and an optional encryption protocol. The encryption protocol is known as WEP (wired equivalent privacy) and is a link-layer security protocol based on the RC4 stream cipher, a symmetric cipher where the same key is used for both encryption and decryption. WEP was intended to provide confidentiality for wireless communications, through the use of encryption; access control for a network, through the option to discard improperly encrypted packets; and data integrity, through the use of a checksum. Unfortunately, however, WEP has been shown to have fundamental flaws (including flaws that allow hackers to uncover the actual cipher keys) which can be exploited to allow unauthorized clients to gain access to an 802.11 WLAN.

Likewise, the authentication process used in 802.11 WLANs is insecure. A client must authenticate and establish an association with an AP 14 prior to transmitting data. An association is simply a binding between the client 12 and an AP 14. The 802.11 standards provide for two types of authentication: open systems authentication and shared-key authentication.

Open systems authentication is usually the default mode of operation and allows any client 12 to associate with an AP 14 as long as the network identifiers (termed "SSID" or service set identification) used by the client 12 and the AP 14 match. Consequently, anyone who knows the SSID of a network can configure a client to be authenticated by an AP 14 on that network. Thus, because such SSIDs are broadcast by APs 14 in the clear as part of their beacon transmissions; open system authentication provides no security whatsoever.

Shared-key authentication is a one-way authentication mechanism used to provide more stringent access to network resources. The term "one-way" authentication is used because although the AP 14 must authenticate the client, there is no provision for a client to authenticate an AP 14. In a shared-key network a client 12 seeking to associate with an AP 14 must successfully encrypt a challenge string issued by the AP 14 before being authenticated. However, because it is the WEP key (and not a different authentication key) that is used in this process, shared-key authentication is really no more secure than WEP itself. Consequently, because WEP keys can be uncovered simply by monitoring transmissions within a WLAN, shared-key authentication networks are also vulnerable to attack.

Recognizing these flaws in 802.11 WLANs, some AP equipment vendors have added an additional security layer in the form of an access control list based on client MAC addresses. In such cases, the AP 14 allows only those clients with authorized MAC addresses to create an association. However, such MAC-address filters are somewhat time consuming to establish and maintain and, consequently, are not often used.

Given the weakness of current 802.11 security mechanisms, some equipment vendors and network operators have begun to implement WLAN access control based on the relatively new IEEE 802.1x standard. The 802.1x standard provides mechanisms for client authentication, network access control, and cryptographic key management within any network (i.e., whether it is a wired or wireless LAN). These mechanisms are based upon an existing authentication protocol known as the Extensible Authentication Protocol (EAP), which is specified in various Internet Engineering Task Force (IETF) Requests For Comments (RFCs). In 802.1x parlance, clients 12 seek access to a network through an authenticator (usually an AP 14 in the case of a WLAN), which refers such requests to an authentication server 18. In practice, the authentication server 18 is usually a Remote Authentication Dial-In User Service (RADIUS) server, although RADIUS is not specifically required by the 802.1x standard. Only if the authentication server verifies the client's 12 identity will the AP 14 allow the client 12 to access other network resources.

What is needed therefore are mechanisms to allow for more widespread deployment of this technology to provide enhanced security for new and existing WLANs. As indicated above, the 802.1x specification provides a procedure for network client authentication. In the context of wireless networks, such authentication is performed via an AP 14 and an authentication server 18, usually a RADIUS server.

Figure 2:
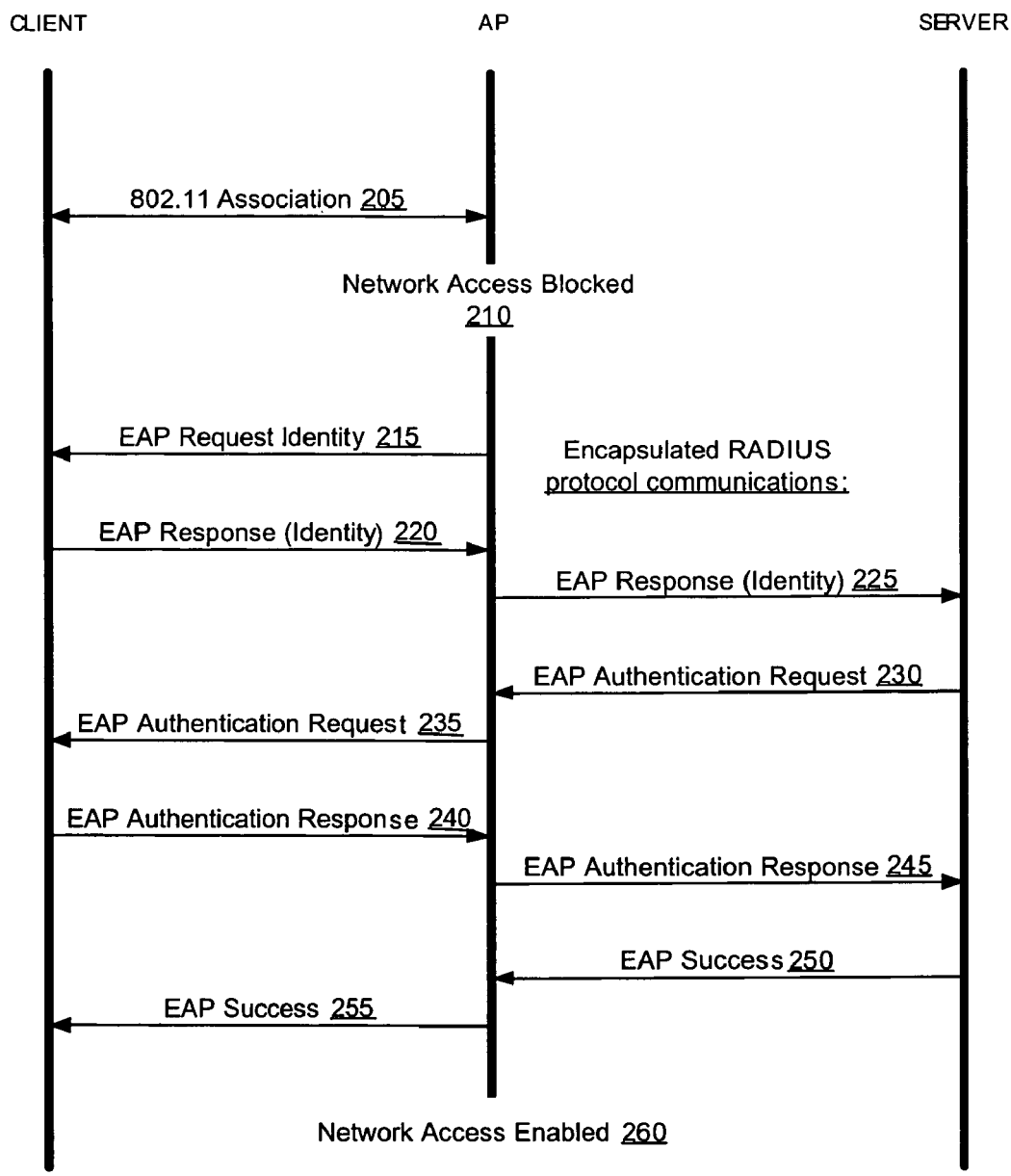
FIG. 2 illustrates the basic authentication process in a typical network, according to one embodiment.

FIG. 2 illustrates the basic authentication process 200 in a typical network, according to one embodiment. As the diagram illustrates, the client 12 (called the supplicant in 802.1x terminology) first establishes an association with the AP 14 (the authenticator) using the conventional 802.11 procedures (205). At this point, however, the AP 14 prevents the client 12 from further accessing network resources until the client is authenticated (210). The authentication process begins with the AP 14 transmitting an EAP request for the client's identity (credentials) (215) and the client 12 providing a response (220). These messages are encapsulated within wireless LAN frames in a process referred to as EAP over LAN.

Thereafter, the EAP information provided by the client 12 is passed by the AP 14 to an authentication server (e.g., a RADIUS server) 18 over the wired LAN 16 (225). This time, the EAP information is encapsulated within a packet that conforms to the RADIUS protocol (a process known as EAP over RADIUS). The authentication server 18 then begins a dialog with the AP 14. The exact details of this exchange vary depending upon which authentication process is used in the network 10, but of importance to the present discussion is the need for the authentication server 18 to properly identify the AP 14 (230). The EAP authentication request is sent to the client 12 (235). The client 12 provides an EAP authentication response (240) to the AP 14. The AP 14 passes the authentication response to the authentication server 18 (245). Unless the AP 14 is properly identified, the authentication server 18 cannot process the authentication request. Assuming the AP 14 is properly identified (250), the authentication server 18 provides the information necessary to verify the client's identity (and in some cases, vice versa) (255), and the client 12 is granted access to the network via AP 14 (260).

Various authentication procedures which might be used in such an authentication scheme include EAP-TLS (transport level security), in which both the client and the authentication server identify themselves to one another using digital certificates; EAP-TTLS (tunneled TLS), in which the client and authentication server identify themselves to one another but only the server has a digital certificate; EAP-SRP (secure remote password), in which both devices are authenticated using a password; EAP-MD5, in which only the client is authenticated by the server on the basis of a password; and protected EAP (PEAP), which uses a secure channel. In the EAP-TLS, EAP-TTLS and EAP-SRP processes, encryption keys for use between the AP 14 and the client 12 are generated as part of the exchange. In PEAP, a secure channel that is both encrypted and integrity-protected with TLS is created and then a new EAP negotiation with another EAP type occurs, authenticating the network access attempt of the client. Because the TLS channel protects EAP negotiation and authentication for the network access attempt, password-based authentication protocols that are normally susceptible to an offline dictionary attack can be used for authentication.

Some software manufacturers, e.g., Microsoft Corp. of Redmond, Wash., are already providing some support for 802.1x authentication processes in their operating systems and other software packages. Microsoft, for example, has provided client-side software to support 802.1x security for wireless connections. Microsoft's client is flexible, meaning that there are many configuration options that a user must program in order for the client to operate correctly. This is a time consuming task for even a sophisticated user and unsophisticated users may be overwhelmed by the number and complexity of the programming operations that are required.

To alleviate this problem, the present invention provides for automatically configuring such software clients. In particular, a software routine (e.g., a device driver or DLL module) that is installed on a client system is configured to recognize when the client selects a new WLAN. That is, the software routine monitors activity on the client's ports used for communication via a WLAN and can detect when the client attempts to connect to a new WLAN (e.g., by recognizing a new SSID broadcast by an AP).

In response, the software routine will automatically configure the software client that supports 802.1x authentication. That is, the software routine of the present invention replaces the human being in interacting with the client software in order to program the necessary parameters for using 802.1x authentication with the new WLAN. All of the parameters required by the software client (e.g., Microsoft's client) may be so programmed and as a result the software will operate correctly.

Figure 3:
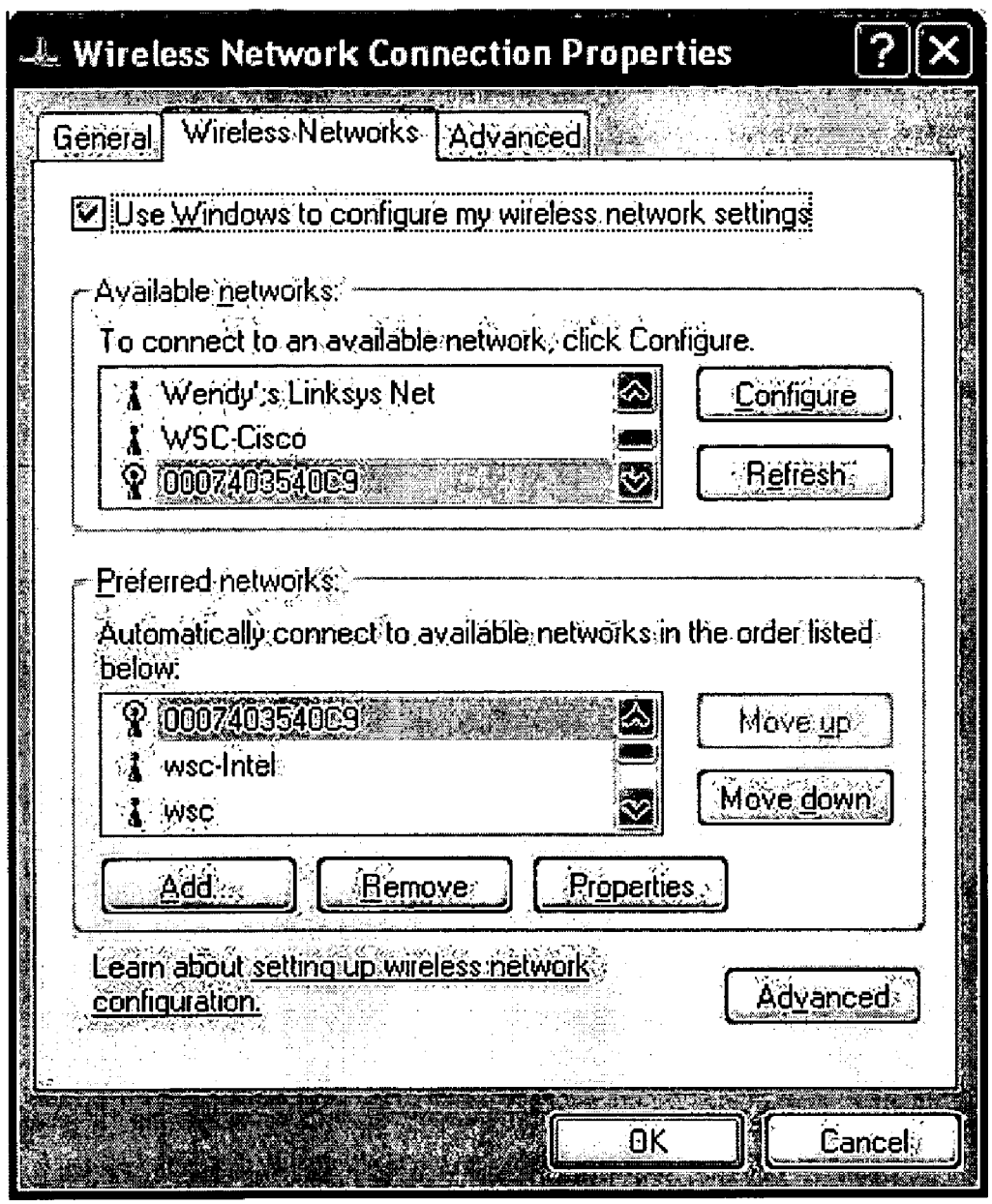
FIG. 3 illustrates an exemplary client configuration screen that is automatically filled-in, according to one embodiment.

An example of such a configuration process is given in FIGS. 3-7, which illustrate various configuration screens for the Microsoft client. In FIG. 3, an initial configuration screen is shown. Here, the software routine would "Add" the appropriate WLAN to the list of networks. The name of the WLAN can be determined from the SSID.

Figure 4:
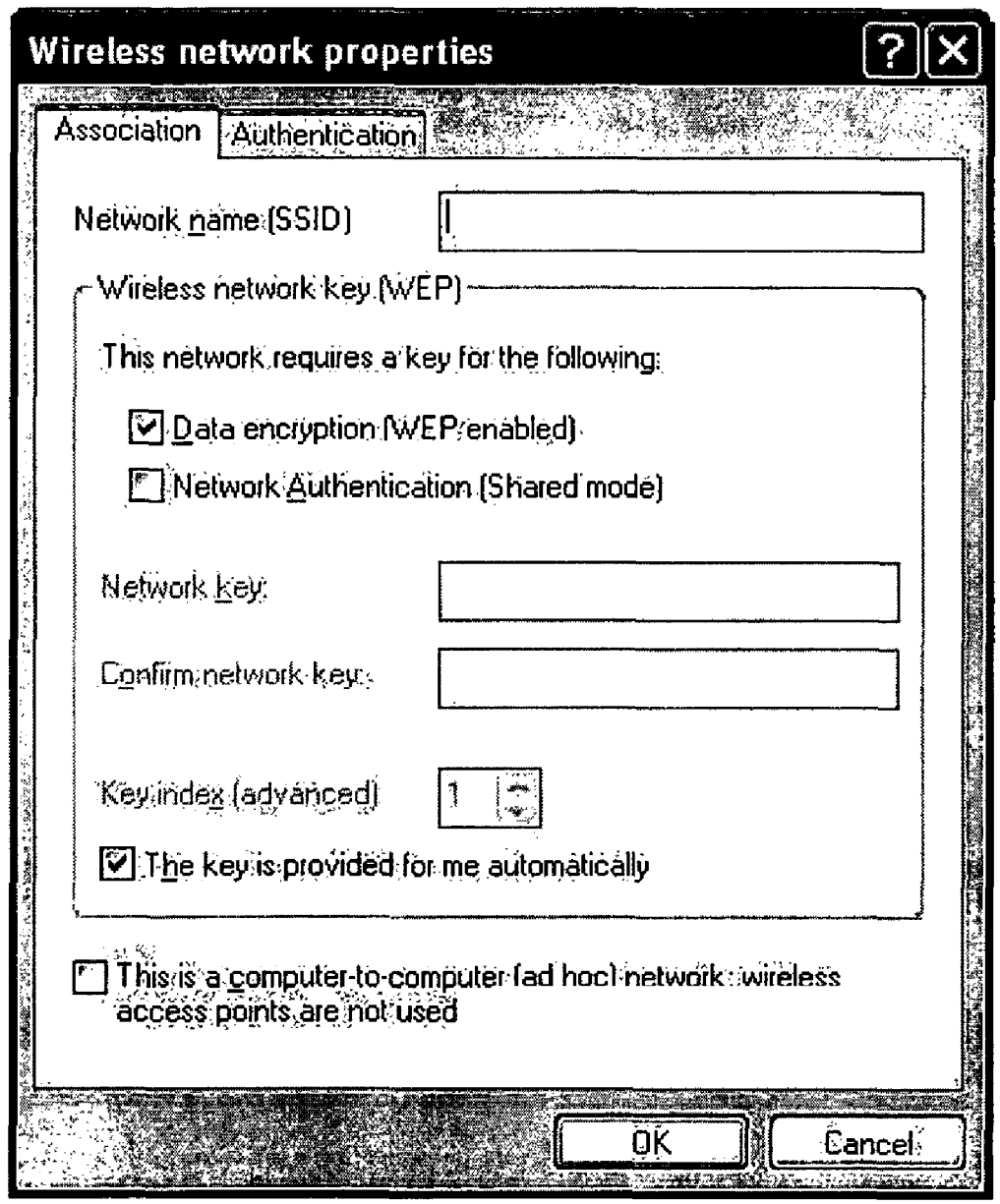
FIG. 4 illustrates an exemplary wireless networks property association screen that is automatically filled-in, according to one embodiment.
Figure 5:
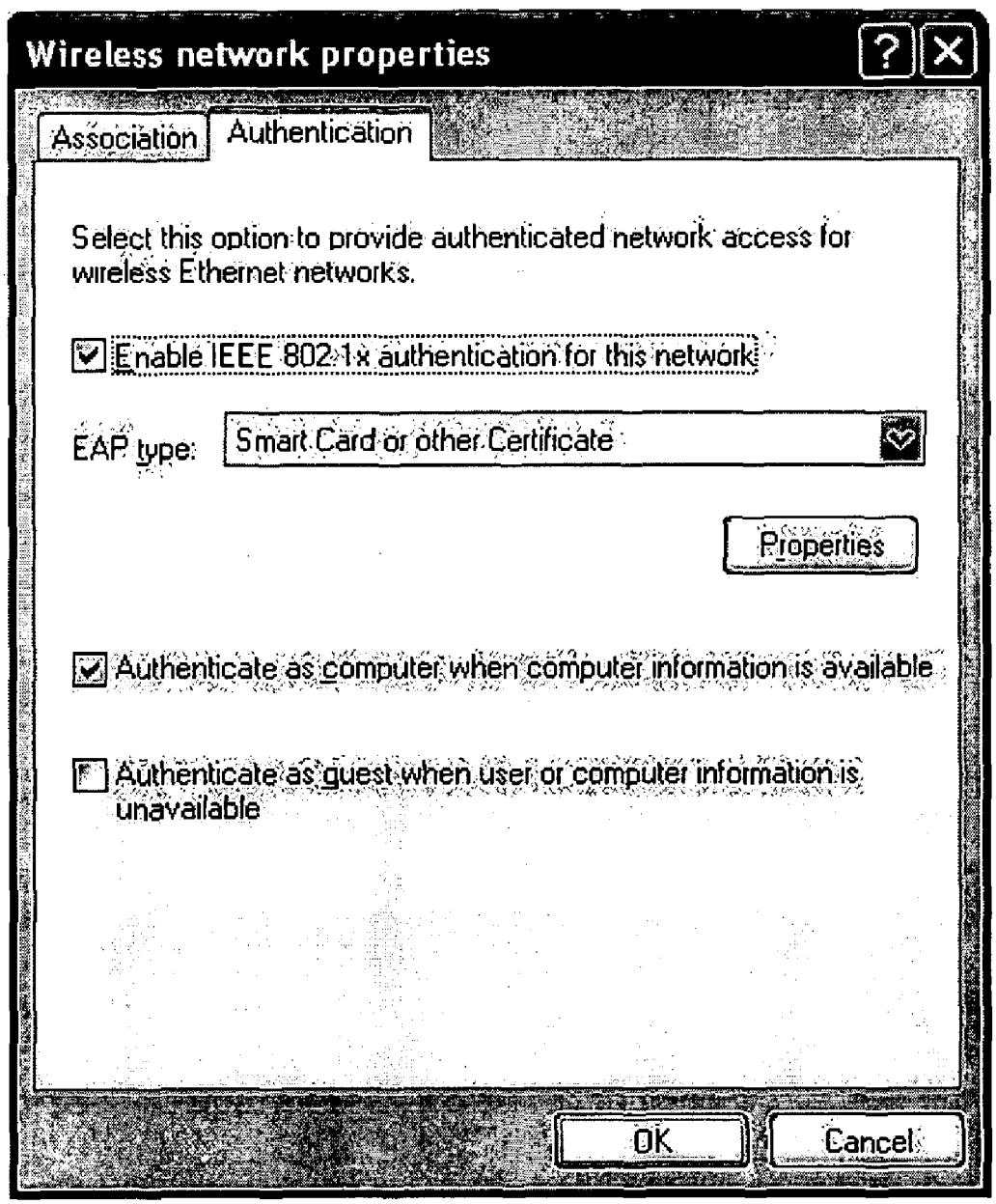
FIG. 5 illustrates an exemplary wireless networks property authentication screen that is automatically filled-in, according to one embodiment.
Figure 6:
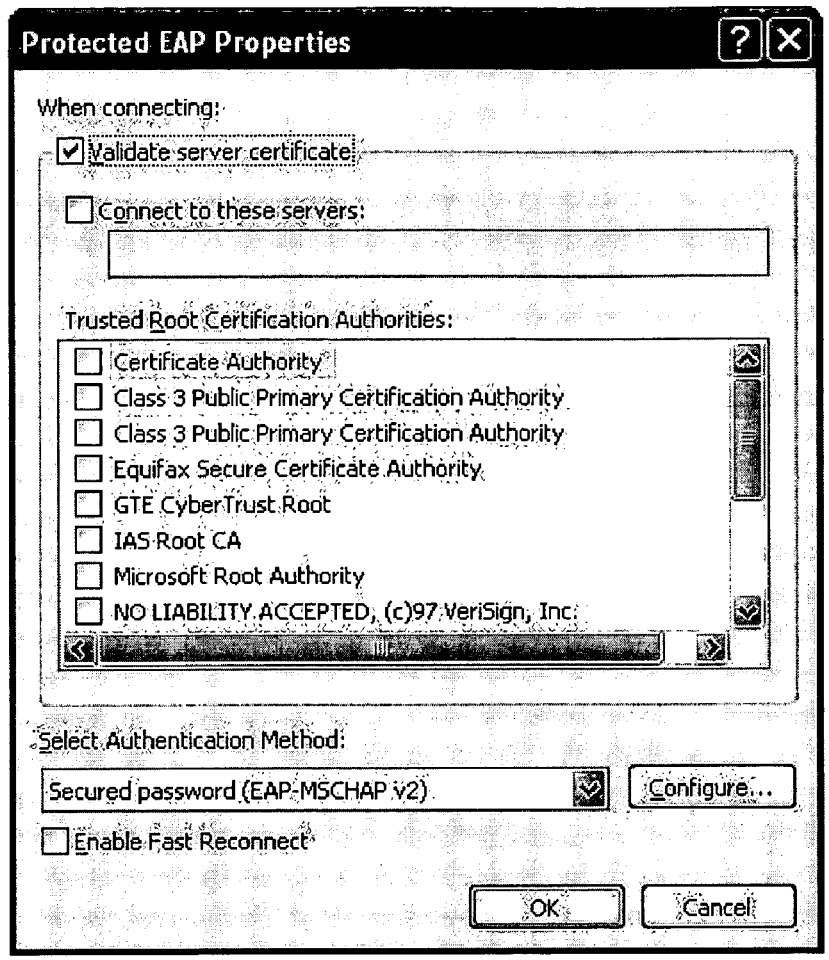
FIG. 6 illustrates an exemplary protected EAP properties screen that is automatically filled-in, according to one embodiment.

Referring now to FIG. 4, when a new network is to be added, the Microsoft client seeks certain details of the network. For example, the SSID and the encryption key details. In this case, the present software routine supplies the SSD automatically and checks the WEP enabled box (and/or WPA enabled box, if present). If the encryption key will be supplied automatically (as is one preferred implementation), that box is also checked.

Certain details present on the "Authentication" panel of the configuration interface (see FIG. 5) must also be specified. For example, the software routine may "un-check" the second box and set the EAP type to PEAP (or another form of EAP). Selecting the "Properties" button then reveals the panel shown in FIG. 6. The various settings are set as required (e.g., as displayed in the figure), and also check the root authorities with a certain name (e.g., Class 3 Public Primary Certification Authority in the above screen). The software routine may also enter a specific server name so that the client will only be able to connect to the appropriate authentication server.

Figure 7:
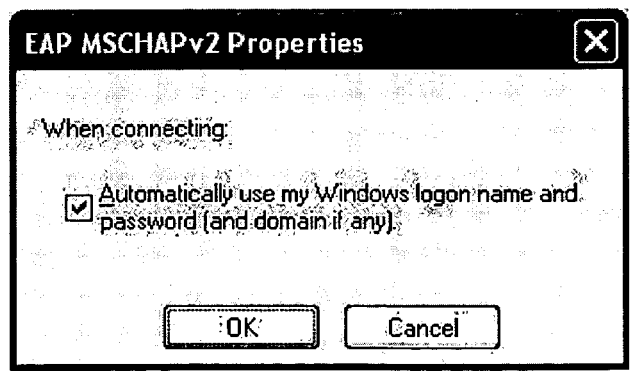
FIG. 7 illustrates an exemplary EAP automatic user identification screen that is automatically filled-in, according to one embodiment.

Selecting the "Configure" button then reveals the panel shown in FIG. 7. The software routine un-checks the box and submits the response. The various open configuration panels are then closed (e.g., by pressing "OK").

Figure 8:
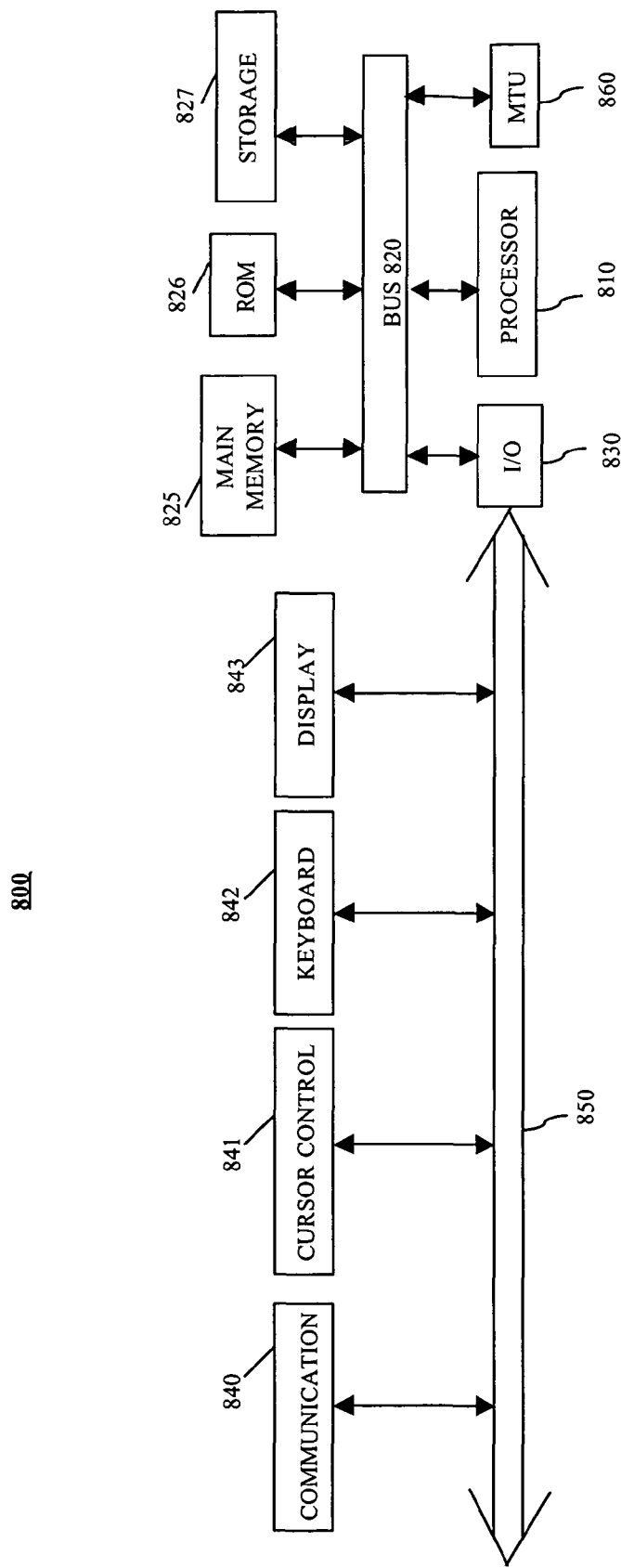
FIG. 8 illustrates an exemplary computer architecture, according to one embodiment of the present invention.

Having briefly described an exemplary software routine which employs various elements of the present invention, a computer system 800 representing exemplary clients 12, and/or servers (e.g., servers 18), in which elements of the present invention may be implemented will now be described with reference to FIG. 8.

One embodiment of computer system 800 comprises a system bus 820 for communicating information, and a processor 810 coupled to bus 820 for processing information. Computer system 800 further comprises a random access memory (RAM) or other dynamic storage device 825 (referred to herein as main memory), coupled to bus 820 for storing information and instructions to be executed by processor 810. Main memory 825 also may be used for storing temporary variables or other intermediate information during execution of instructions by processor 810. Computer system 800 also may include a read only memory (ROM) and/or other static storage device 826 coupled to bus 820 for storing static information and instructions used by processor 810.

A data storage device 827 such as a magnetic disk or optical disc and its corresponding drive may also be coupled to computer system 800 for storing information and instructions. Computer system 800 can also be coupled to a second I/O bus 850 via an I/O interface 830. Multiple I/O devices may be coupled to I/O bus 850, including a display device 843, an input device (e.g., an alphanumeric input device 842 and/or a cursor control device 841). For example, Internet information may be presented to the user on the display device 843.

The communication device 840 is for accessing other computers (servers or clients) via a network 10, 16, or 20. The communication device 840 may comprise a modem, a network interface card, or other well-known interface device, such as those used for coupling to Ethernet, token ring, or other types of networks.

Thus, mechanisms for automatically configuring a client to participate in 802.1x authentication processes have been described. It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method, comprising configuring automatically, a wireless network node for a wireless network by automatically providing network configuration information to a software client of the wireless network node using a software routine installed on the wireless network client;
   wherein the network configuration information that is automatically provided includes an SSID, WEP enablement, WPA enablement, EAP properties, and an authentication method for the wireless network node;
   wherein the network configuration information is specific to an operating system and a network type of the wireless network node;
   wherein the wireless network node is configured automatically when the software routine detects an attempt by the wireless network node to connect to a new WLAN by monitoring activity on ports of the wireless network node and identifying a new SSID broadcasted by an access point;
   wherein the network configuration information that is automatically provided includes at least one of encryption key values, specific servers, trusted root certification authorities, and automatic logon preferences;
   wherein the software routine adds a name of the new WLAN to a list of networks, supplies the SSID and encryption key details, checks at least one of a WEP enable box, a WPA enable box and an automatic encryption key box of a configuration screen, and enters a name of an authentication server for allowing a connection between the wireless network node and the authentication server.

2. The method of claim 1 wherein the network configuration information that is automatically provided includes a list of available networks, the encryption key values, the specific servers, the trusted root certification authorities, and the automatic logon preferences.

3. The method of claim 2 wherein the network configuration information that is automatically provided further includes some or all of 802.1x authentication activation, EAP type, guest authentication, and computer authentication information.

4. The method of claim 1 wherein the network configuration information that is automatically'provided includes some or all of 802.1x authentication activation and EAP settings.

5. The method of claim 1, wherein the network configuration information that is automatically provided includes a list of available networks.

6. The method of claim 1, wherein the network configuration information that is automatically provided includes the encryption key values.

7. The method of claim 1, wherein the network configuration information that is automatically provided includes the specific servers.

8. The method of claim 1, wherein the network configuration information that is automatically provided includes the trusted root certification authorities.

9. The method of claim 1, wherein the network configuration information that is automatically provided includes the automatic logon preferences.

10. The method of claim 1, wherein the wireless network node is configured automatically when the software routine detects that a user selects the new WLAN.

11. The method of claim 1, wherein the software routine enters a specific name of the authentication server on a authentication panel of the configuration screen such that wireless network node will only be able to connect to the authentication server.

12. The method of claim 1, wherein the ports of the wireless network node include ports used for communication via the new WLAN.

13. The method of claim 1, wherein the software routine adds the name of the new WLAN to the list of networks in response to the detection of the attempt by the wireless node to connect to the new WLAN.

14. A method comprising configuring a wireless network node for a wireless network by automatically providing network configuration information to a software client of the wireless network node using a software routine installed on a network server of a wired network connected to the wireless network node;
   wherein the network configuration information that is automatically provided includes an SSID, WEP enablement, WPA enablement, EAP properties, and an authentication method for the wireless network node;
   wherein the network configuration information is specific to an operating system and a network type of the wireless network node;
   wherein the wireless network node is configured automatically when the software routine detects an attempt by the wireless network node to connect to a new WLAN by monitoring activity on ports of the wireless network node and identifying a new SSID broadcasted by an access point;
   wherein the network configuration information that is automatically provided includes at least one of encryption key values, specific servers, trusted root certification authorities, and automatic logon preferences;
   wherein the software routine adds a name of the new WLAN to a list of networks, supplies the SSID and encryption key details, checks at least one of a WEP enable box, a WPA enable box and an automatic encryption key box of a configuration screen, and enters a name of an authentication server for allowing a connection between the wireless network node and the authentication server.

15. A wireless network node, comprising:
   a processor; and
   a software routine stored on a computer readable medium accessible by the processor and which when executed by the processor automatically configures a wireless network node for use on a wireless network by automatically providing network configuration information to a software client of the wireless network node;
   wherein the network configuration information that is automatically provided includes an SSID, WEP enablement, WPA enablement, EAP properties, and an authentication method for the wireless network node;
   wherein the network configuration information is specific to an operating system and a network type of the wireless network node;
   wherein the software routine is operable such that the wireless network node is configured automatically when the software routine detects an attempt by the wireless network node to connect to a new WLAN by monitoring activity on ports of the wireless network node and identifying a new SSID broadcasted by an access point;
   wherein the network configuration information that is automatically provided includes at least one of encryption key values, specific servers, trusted root certification authorities, and automatic logon preferences;

wherein the software routine adds a name of the new WLAN to a list of networks, supplies the SSID and encryption key details, checks at least one of a WEP enable box, a WPA enable box and an automatic encryption key box of a configuration screen, and enters a name of an authentication server for allowing a connection between the wireless network node and the authentication server.

16. The wireless network node of claim 15 wherein the network configuration information that is automatically provided includes a list of available networks, the encryption key values, the specific servers, the trusted root certification authorities, and the automatic logon preferences.

17. The wireless network node of claim 16 wherein the network configuration information that is automatically provided further includes 802.1x authentication activation, EAP type, guest authentication, computer authentication.

18. A non-transitory computer-readable medium having stored thereon a plurality of computer-readable instructions, which when executed by a computer system, cause said computer system to automatically configure a wireless network node for a wireless network by automatically providing network configuration information to a software client of the wireless network node;
   wherein the network configuration information that is automatically provided includes an SSID, WEP enablement, WPA enablement, EAP properties, and an authentication method for the wireless network node;
   wherein the network configuration information is specific to an operating system and a network type of the wireless network node;
   wherein the computer-readable instructions are operable such that the wireless network node is configured automatically when a software routine detects an attempt by the wireless network node to connect to a new WLAN by monitoring activity on ports of the wireless network node and identifying a new SSID broadcasted by an access point;
   wherein the network configuration information that is automatically provided includes at least one of encryption key values, specific servers, trusted root certification authorities, and automatic logon preferences;
   wherein the software routine adds a name of the new WLAN to a list of networks, supplies the SSID and encryption key details, checks at least one of a WEP enable box, a WPA enable box and an automatic encryption key box of a configuration screen, and enters a name of an authentication server for allowing a connection between the wireless network node and the authentication server.

19. The computer-readable medium of claim 18 wherein the network configuration information that is automatically provided includes a list of available networks, the encryption key values, the specific servers, the trusted root certification authorities, and the automatic logon preferences.

20. The computer-readable medium of claim 19 wherein the network configuration information that is automatically provided further includes some or all of 802.1x authentication activation, EAP type, guest authentication, and computer authentication information.

* * * * *